March 20, 1962 R. J. ASH 3,025,734
TIRE VALVE CAP TOOL
Filed April 13, 1960
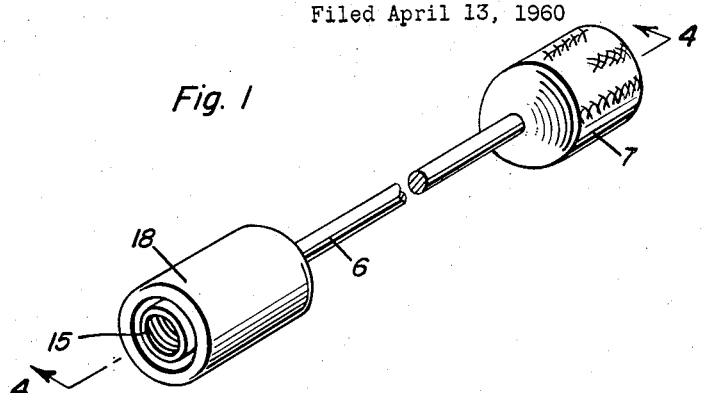
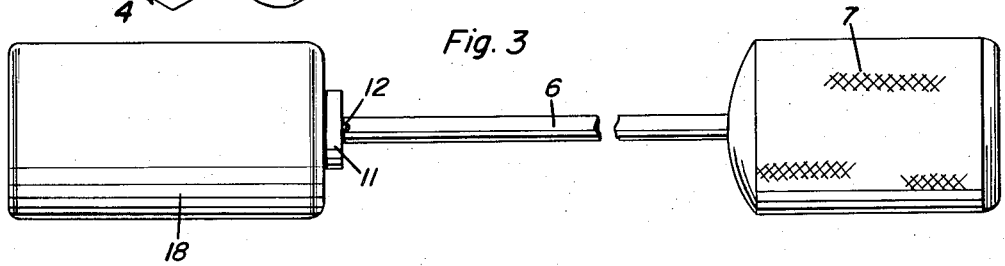
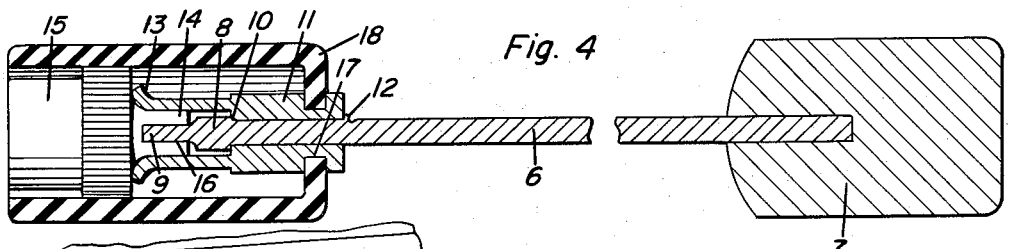
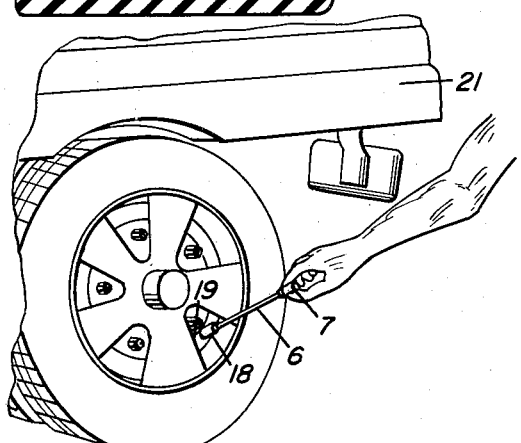
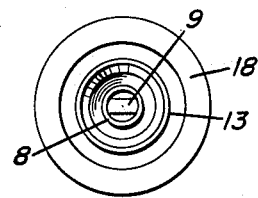
Raymond J. Ash
INVENTOR.

United States Patent Office 3,025,734
Patented Mar. 20, 1962

3,025,734
TIRE VALVE CAP TOOL
Raymond J. Ash, 16798 Yucca St., Victorville, Calif.
Filed Apr. 13, 1960, Ser. No. 21,910
4 Claims. (Cl. 81—90)

This invention relates to new and useful improvements in tire valve stem cap tools and has for its primary object to provide, in a manner as hereinafter set forth, novel means whereby the relatively inaccessible or difficult valve stem caps on the inner tires of dual vehicle wheels may be expeditiously removed and applied.

Another very important object of the present invention is to provide unique means for operatively connecting the tool to the cap whereby turning of the cap with the tool is insured and splitting of said cap is prevented.

Other objects of the invention are to provide a tire valve stem cap tool of the aforementioned character which will be comparatively simple in construction, strong, durable, compact, of light weight and which may be manufactured at low cost.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view of a tool constructed in accordance with the present invention;

FIGURE 2 is a perspective view, showing the tool in use;

FIGURE 3 is an elevational view of the tool;

FIGURE 4 is a view in longitudinal section through the device, taken substantially on the line 4—4 of FIGURE 1; and FIGURE 5 is an end elevational view.

Referring now to the drawing in detail, it will be seen that the embodiment of the invention which has been illustrated comprises a metallic shaft or shank 6 of suitable length and diameter. Fixed on one end portion of the shank 6 is an operating handle 7 of suitable material. The forward end portion of the shank 6 is provided with a head 8 which terminates in a forwardly projecting bit 9, said head providing a shoulder 10.

Mounted on the shank 6, between the shoulder 10 and a stop 12 which is provided therefor on said shank, is a guide sleeve 11. The sleeve 11 includes a relatively thin, flared, internally and externally reduced forward end portion 13 which receives the usual split or kerfed reduced end portion 14 of a conventional pneumatic tire valve stem cap 15. As shown to advantage in FIGURE 4 of the drawing, the flared end portion of the guide sleeve 11 encloses the elements 8 and 9. The bit 9 is engageable in the tool slot or kerf 16 of the cap 15 for operatively connecting the tool to said cap.

The rear end portion of the guide sleeve 11 has formed therein a circumferential groove or channel 17. Mounted on the guide sleeve 11 and engaged in the groove 17 thereof is a generally cup-shaped resilient chuck 18 of rubber or other suitable material. The chuck 18 is spaced concentrically from the elements 11 and 13 and projects forwardly therebeyond. The resilient chuck 18 is adapted to receive under tension the cap 15 and frictionally retain the same.

It is thought that the use of the tool will be readily apparent from a consideration of the foregoing. Briefly, the resilient rubber chuck 18 is slipped longitudinally over the body of the valve cap 15 to be removed. When thus applied the resilient chuck 18 is slightly tensioned for frictionally gripping and retaining the valve cap and for accommodating caps of various sizes. As the tool is thus applied the flared end portion 13 of the guide sleeve 11 slips on to the reduced outer end portion 14 of the cap 15 and guides the bit 9 into the slot or kerf 16 in an obvious manner. Through the medium of the handle or grip 7 the tool is then rotated for turning the cap. The end portion 13 of the guide sleeve 11 also positively prevents the end portion 14 of the cap 15 from splitting or spreading if excessive torque is applied. In FIGURE 2 of the drawing, the tool is shown applied to the valve stem 19 of the inner tire on a dual wheel 20 of a motor vehicle 21.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A tool for applying and removing pneumatic tire valve stem caps of the type including a cylindrical body and a reduced end portion having a kerf therein, said tool comprising: a shank, a handle on one end portion of said shank, a bit on the other end of the shank engageable in the kerf for operatively connecting said shank to the cap for turning the same, a sleeve on the shank slidable on said reduced end portion of the cap body for guiding the bit into the kerf, and a chuck on the sleeve spaced concentrically therefrom and projecting forwardly therebeyond for slidably receiving the cap body.

2. A tool for applying and removing pneumatic tire valve stem caps of the type including a cylindrical body and a reduced end portion having a kerf therein, said tool comprising: a shank, a handle on one end portion of said shank, a bit on the other end of the shank engageable in the kerf for operatively connecting said shank to the cap for turning the same, a sleeve on the shank slidable on said reduced end portion of the cap body for guiding the bit into the kerf, and a chuck on the sleeve spaced concentrically therefrom and projecting forwardly therebeyond for slidably receiving the cap body, said chuck being of a resilient material engageable under tension with the cap body for frictionally turning the cap in unison with said chuck and for retaining said cap in operative engagement with the bit.

3. A tool for applying and removing pneumatic tire valve stem caps of the type including a cylindrical body and a reduced end portion having a kerf therein, said tool comprising: a shank, an operating handle on one end portion of said shank, a head on the other end of the shank providing a shoulder, a bit on said head engageable in the kerf, a sleeve fixed on the shank in abutting engagement with the shoulder, said sleeve having a circumferential groove therein, said sleeve including a flared forward end portion slidably engageable on the reduced end portion of the cap body for guiding the bit into the kerf, and a resilient, generally cup-shaped chuck mounted on the sleeve and engaged in the groove, said resilient chuck encircling the sleeve in spaced, concentric relation thereto and projecting forwardly therebeyond for sliding engagement under tension with the cap body for frictionally retaining the cap.

4. A tool for applying and removing pneumatic tire valve stem caps of of the type comprising a cylindrical body and a reduced end portion, said tool including a shank, a handle on one end portion of the shank, a turning member on the other end portion of said shank engageable with the reduced cap end portion for operatively connecting said shank to the cap for turning same, a sleeve on the shank slidable on said reduced cap end portion for guiding said turning member into engagement therewith, and a chuck on the sleeve spaced concentrically therefrom and projecting forwardly therebeyond for slidably receiving the cap body.

References Cited in the file of this patent

UNITED STATES PATENTS

| | | |
|---|---|---|
| 1,686,681 | Canode | Oct. 9, 1928 |
| 2,701,491 | Ross | Feb. 8, 1955 |
| 2,733,456 | Howell | Feb. 7, 1956 |
| 2,857,794 | Red | Oct. 28, 1958 |